United States Patent
Penza et al.

(10) Patent No.: US 9,869,420 B2
(45) Date of Patent: Jan. 16, 2018

(54) SYSTEM AND METHOD FOR PIPELINE MAINTENANCE

(71) Applicant: ULC ROBOTICS, INC., Hauppauge, NY (US)

(72) Inventors: G. Gregory Penza, Old Field, NY (US); Robert E. Kodadek, Long Beach, NY (US); Michael Passaretti, Smithtown, NY (US); Michael Hauser, East Rockaway, NY (US); Eric S. Feldman, Glen Head, NY (US); Benjamin Lagosz-Sinclair, Brooklyn, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 0 days.

(21) Appl. No.: 14/700,288

(22) Filed: Apr. 30, 2015

(65) Prior Publication Data

US 2015/0316195 A1 Nov. 5, 2015

Related U.S. Application Data

(60) Provisional application No. 61/987,110, filed on May 1, 2014.

(51) Int. Cl.
*F16L 55/28* (2006.01)
*F16L 55/32* (2006.01)
(Continued)

(52) U.S. Cl.
CPC ............. *F16L 55/28* (2013.01); *F16L 55/265* (2013.01); *F16L 55/32* (2013.01); *G03B 37/005* (2013.01); *F16L 2101/30* (2013.01)

(58) Field of Classification Search
CPC ...................................................... F16L 55/28
(Continued)

(56) References Cited

U.S. PATENT DOCUMENTS 4,537,136 A * 8/1985 Douglas .................. F16L 55/30
104/138.2
4,677,865 A 7/1987 Lehmann
(Continued)

FOREIGN PATENT DOCUMENTS

| CN | 104500914 A | 4/2015 |
|---|---|---|
| DE | 10215325 | * 10/2003 |

(Continued)

OTHER PUBLICATIONS

ULC Pipeline Robotics, "Big Cisbot, Robotic Cast Iron Joint Sealing" brochure, www.ulcrobotics.com, accessed Mar. 18, 2015.
(Continued)

*Primary Examiner* — Sunil Singh
(74) *Attorney, Agent, or Firm* — Brooks Kushman P.C.

(57) ABSTRACT

A system and method for pipeline maintenance may include a payload and a transport module having the payload attached thereto. The transport module may include a plurality of movable arms each having at least one respective wheel. At least some of the wheels may be drive wheels which are operable in a first orientation to drive the transport module linearly along a length of a pipeline, and are further operable in a second orientation to drive the transport module circumferentially around an inner surface of the pipeline. At least some of the arms are operable to move the payload in a generally radial direction toward and away from an interior surface of the pipeline.

17 Claims, 11 Drawing Sheets

(51) Int. Cl.
*F16L 55/26* (2006.01)
*G03B 37/00* (2006.01)
*F16L 101/30* (2006.01)

(58) Field of Classification Search
USPC ....... 104/138.2; 15/104.31, 104.09, 104.062, 15/104.061, 104.05; 138/89, 90, 93, 97, 138/98; 73/49.1, 865.8, 866.5, 623; 405/184.1
See application file for complete search history.

(56) References Cited

U.S. PATENT DOCUMENTS

| | | | |
|---|---|---|---|
| 6,031,371 | A | 2/2000 | Smart |
| 6,142,187 | A * | 11/2000 | Goldenberg ............ F16L 55/28 138/97 |
| 7,812,328 | B2 * | 10/2010 | Betz ...................... B01J 19/123 104/138.2 |
| 8,060,257 | B2 | 11/2011 | Close et al. |
| 8,079,432 | B2 | 12/2011 | Ohm et al. |
| 8,170,715 | B1 | 5/2012 | Vallapuzha et al. |
| 8,925,590 | B2 | 1/2015 | Khalifa et al. |
| 2007/0174983 | A1 * | 8/2007 | Smith ..................... F16L 55/28 15/104.061 |
| 2008/0289421 | A1 * | 11/2008 | Brignac .................. F16L 55/28 73/596 |
| 2011/0196534 | A1 | 8/2011 | Ekes et al. |
| 2012/0197440 | A1 | 8/2012 | Farkavec et al. |

FOREIGN PATENT DOCUMENTS

| | | | |
|---|---|---|---|
| JP | 5-331905 | * | 12/1993 |
| JP | 5-338535 | * | 12/1993 |
| JP | H08233976 A | | 9/1996 |
| KR | 10-0784932 | * | 12/2007 |

OTHER PUBLICATIONS

ULC Robotics, "Big Cisbot Overview," www.ulcrobotics.com, dated Sep. 11, 2012.
Oct. 29, 2015 Search Report from GB Application No. 1507444.6.

* cited by examiner

SYSTEM AND METHOD FOR PIPELINE MAINTENANCE

CROSS-REFERENCE TO RELATED APPLICATIONS

This application claims the benefit of U.S. provisional application No. 61/987,110 filed 1 May 2014, which is hereby incorporated herein by reference.

TECHNICAL FIELD

The present invention relates to a system and method for pipeline maintenance.

BACKGROUND

A number of systems and methods currently exist for inspecting gas pipelines, some of which may be performed "live"—i.e., where the gas has not been shut off to the area being inspected. Although it may be possible to use a small inspection camera to identify and even accurately locate an area in a pipeline that needs repair, performing the actual repair typically requires excavation to provide access for a repair crew. This type of excavation is disruptive and costly, and therefore a need exists for a system and method that can be utilized to perform repair functions, such as sealing a leaking joint, without the need to perform large excavation.

SUMMARY

At least some embodiments of the invention include a system for pipeline maintenance that includes a payload and a transport module having the payload attached thereto. The transport module includes a plurality of movable arms each having at least one respective wheel. At least some of the wheels are drive wheels and are operable: (a) in a first orientation to drive the transport module linearly along a length of a pipeline, and (b) in a second orientation to drive the transport module circumferentially around an inner surface of the pipeline. At least some of the arms are operable to move the payload in a generally radial direction toward and away from an interior surface of the pipeline.

At least some embodiments of the invention include a system for pipeline maintenance that includes a payload having at least one of a sensor arrangement or a tool arrangement. A transport module is connected to the payload and includes a plurality of movable arms. At least some of the arms are operable to move the payload toward and away from a wall inside the pipeline. The transport module also includes a plurality of drive wheels, each of which is attached to a respective one of the movable arms. The drive wheels are operable to drive the transport module longitudinally along the wall inside the pipeline, and further operable to drive the transport module circumferentially around the wall inside the pipeline.

At least some embodiments of the invention include a method for pipeline maintenance that includes launching a transport module carrying a payload into a pipeline, and extending a plurality of arms from the transport module toward an interior surface of the pipeline such that drive wheels, each of which is attached to a respective one of the arms, contact the interior surface of the pipeline. The drive wheels are operated while in a first orientation to move the transport module linearly along a length of a pipeline. Operation of the drive wheels is stopped and at least some of them are rotated from the first orientation to a second orientation wherein a respective first axis of each rotated wheel is generally parallel to a longitudinal axis of the pipeline. The method may further include driving the drive wheels to rotate the transport module from a first radial position to a second radial position, and pivoting the arms to move the payload toward the interior surface of the pipeline.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
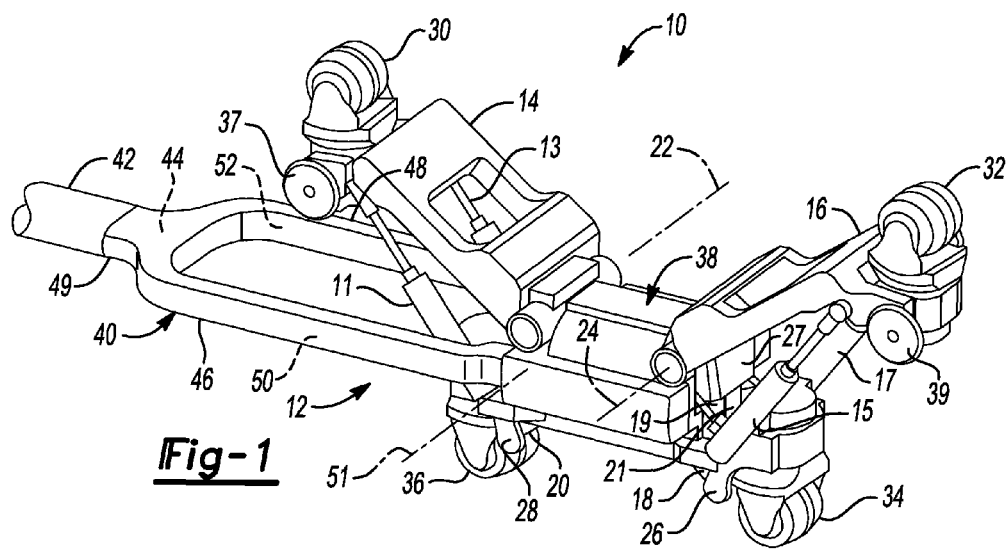
FIG. 1 shows a system in accordance with embodiments of the present invention having a payload configured for pipeline joint repair.

FIG. 1 shows a portion of a system 10 in accordance with embodiments of the present invention. The system 10 is configured for pipeline maintenance, which may include inspection, repair, or both, of pipelines and their associated structures. Inspection maintenance may include a search for, and identification of, wall thinning, cracks, corrosion, stress, strain, leaks and other problems detrimental to long-term, continued use of the pipeline. Repair maintenance may include repair of problem areas, such as sealing leaking joint seals. The system 10 includes a transport module generally indicated at 12. The transport module 12 includes a plurality of arms 14, 16, 18, 20. The two longer arms 14, 16 are pivotable about respective axes 22, 24. The two shorter arms 18, 20 are connected to the transport module 12 through linkages 26, 28, and although portions of the linkages 26, 28 pivot relative to other portions of the transport module 12, the linkages 26, 28 effect a more vertical movement of the arms 18, 20, as opposed to the generally arcuate movement of the longer arms 14, 16.

To effect movement of the arms 14, 16, 18, 20, the embodiment of the system 10 shown in FIG. 1 uses a number of pneumatic cylinders. For example, the two longer arms 14, 16 each utilize two pneumatic cylinders 11, 13 and 15, 17, respectively. In contrast, the arm 18 utilizes a pneumatic cylinder 27, having two piston rods 19, 21, and arm 20 utilizes a pneumatic cylinder 29, also having two piston rods 23, 25—see FIG. 2. Each of the arms 14, 16, 18, 20 carries a respective drive wheel 30, 32, 34, 36. In the embodiment shown in FIG. 1, each of the arms 14, 16, 18, 20 carries a single drive wheel, although in other embodiments more than one drive wheel may be attached to at least some of the arms, and in some embodiments, some arms may carry no drive wheels.

As explained in more detail below, the wheels 30, 32, 34, 36 are operable to drive the transport module 12 linearly along a length of a pipeline when they are positioned with a first orientation as shown in FIG. 1. Because each of the arms 14, 16, 18, 20 is movable, and because the shorter arms 18, 20 nest within the longer arms 16, 14, the system 10 can be launched into a large pipeline through a relatively small launch tube—this is explained in more detail below with reference to FIG. 17. This feature helps to limit the amount of excavation necessary to perform the required maintenance.

In the embodiment shown in FIG. 1, the system 10 can enter a pipeline through a 12-15 inch launch tube while still having arms 14, 16, 18, 20 which are long enough to extend to the inside diameters of a 48 inch pipeline. The arms 14, 16 also include idler wheels 37, 39, respectively, and although they are not visible in FIG. 1, there is a respective second idler wheel 41, 43 on the opposite side of the arms 14, 16—see FIGS. 2 and 3. The idler wheels 37, 39 are positioned on their respective arms 14, 16 such that at least one of them may contact the interior surface of a pipeline when the transport module 12 is launched into the pipeline. This is explained in more detail below with reference to FIG. 17.

The transport module 12 carries a payload 38, which, in the embodiment shown in FIG. 1, is a repair module. In this embodiment the payload has a single enclosure, but, in other embodiments, the payload may include multiple enclosures or a single enclosure that pivots to allow it to traverse tight-angle bends while entering and exiting the pipeline. As explained in more detail below, the payload 38 includes drills and sealant injection nozzles specifically configured to repair leaking joints from inside a pipeline. The system 10 shown in FIG. 1 also includes a cable guide 40, which is configured to carry a cable 42 to provide access for any of a number of necessary or desirable elements, such as power and communications for the wheels 30, 32, 34, 36 and the payload 38. The cable guide 40 includes an internal space 44 configured to receive the cable 42 therein to provide a secure routing for the cable to the payload 38.

In addition to the transport module 12, payload 38 and cable guide 40, a system, such as the system 10, may include other elements, at least some of which may be remotely located from the pipeline. For example video monitors or other output devices may be used to interpret and display signals output from the payload 38 and through the cable 42. Although the system 10 is described and illustrated as using the cable 42 to provide power, communications, etc. to and from the transport module 12 and payload 38, it is understood that wireless signals may also be used. Although a cable, such as the cable 42, may conveniently carry power and communications to and from a transport module, it may also serve as a retrieval device in the case of a power failure or other inability of the drive wheels to return the transport module to the entry point of the pipeline.

Although transport modules in accordance with embodiments of the present invention, such as the transport module 12, may be scaled to be used in pipelines of various sizes, in some embodiments, the transport module may be between 40 and 50 inches in length, which does not include the attached cable guide. A transport module of this size may be appropriate for a 24 inch diameter pipeline, for example. Payloads, such as the payload 38, may also be of various sizes. For example, with a transport module that is 40-50 inches in length, the payload may account for 10-12 inches of that length. Drive wheels, such as the drive wheels illustrated in FIG. 1, may be approximately 4 inches in diameter with the corresponding idler wheels being somewhat smaller.

In the embodiment shown in FIG. 1, the cable guide 40 includes two cable-guide arms 46, 48, which are attached to opposite sides of the transport module 12. Each of the cable-guide arms 46, 48 includes a conduit 50, 52, respectively, which is part of the internal space 44. This allows a portion of the communications, power, pneumatics, fluid transport and other lines from the cable 42 to be routed to different sides of the payload 38. The internal space 44, including the conduits 50, 52, may be configured as a channel with an open area, for example, toward the bottom of the cable guide 40 to allow easy access to the various lines running through the cable 42, and to facilitate routing them through the cable-guide arms 46, 48. Alternatively, the internal space 44, including the conduits 50, 52, may be closed on all sides so that lines from the cable 42 need to be routed through them blindly until they exit the other end of the cable guide 40 to be connected to the transport module 12. The two cable-guide arms 46, 48 connect to each other at a position 49 away from the transport module 12 to form a point of entry for the cable 42. The cable guide 40 thus defines a conduit arrangement extending outward from the transport module 12. The cable guide 40 may be pivotably attached to the transport module 12 to facilitate entry into and exit from the inside of a pipeline. For example, the transport module 12 may pivot around an axis, such as the axis 51 shown in FIG. 1; this is explained in more detail in conjunction with FIG. 11.

Figure 2:
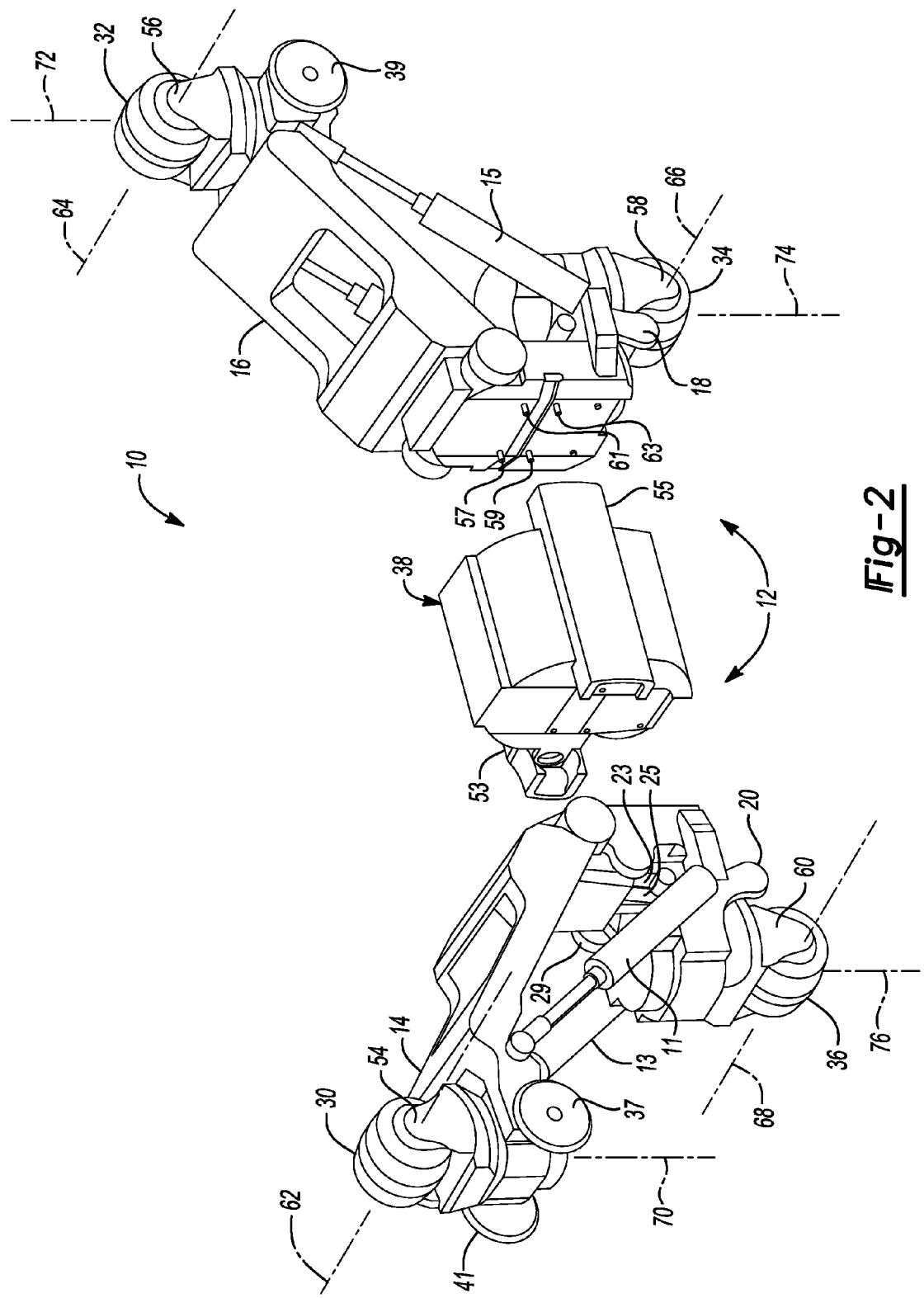
FIG. 2; shows an exploded view of the system from FIG. 1

Powering the wheels 30, 32, 34, 36 are respective drive motors and gears integrated within the wheel hubs 54, 56, 58, 60—see FIG. 2. The motors may be, for example, high-power, brushless motors, with gearing, which provide enough torque to carry the payload 38 and the cable 42 down a long length of a pipeline, for example, 150 meters (m) or more. Including the proper gearing for the motors may be important to reduce speed and increase torque. For example, in some embodiments, there may be two gearing systems in each wheel assembly: planetary gearing connected directly to the brushless motor output, and a harmonic gear drive connected to the planetary gearing and to the wheel hub itself. As described above, the arms 14, 16, 18, 20 are actuated by pneumatic cylinders 11, 13, 15, 17, 27, 29. To facilitate their operation, the cable 42 may also carry, for example, a nitrogen line to provide pneumatic pressure to actuate and pivot the arms 14, 16, 18, 20. FIG. 2 also illustrates attachments between the transport module 12 and the payload 38. Specifically, the payload 38 is disposed within two housing portions 53, 55, which attach directly to portions of the transport module 12, for example, by fasteners 57, 59, 61, 63. Although the fastening arrangement is shown on only one side of the payload 38, it is understood that a similar fastening arrangement is disposed on the other side of the payload 38 and transport module 12.

Figure 3:
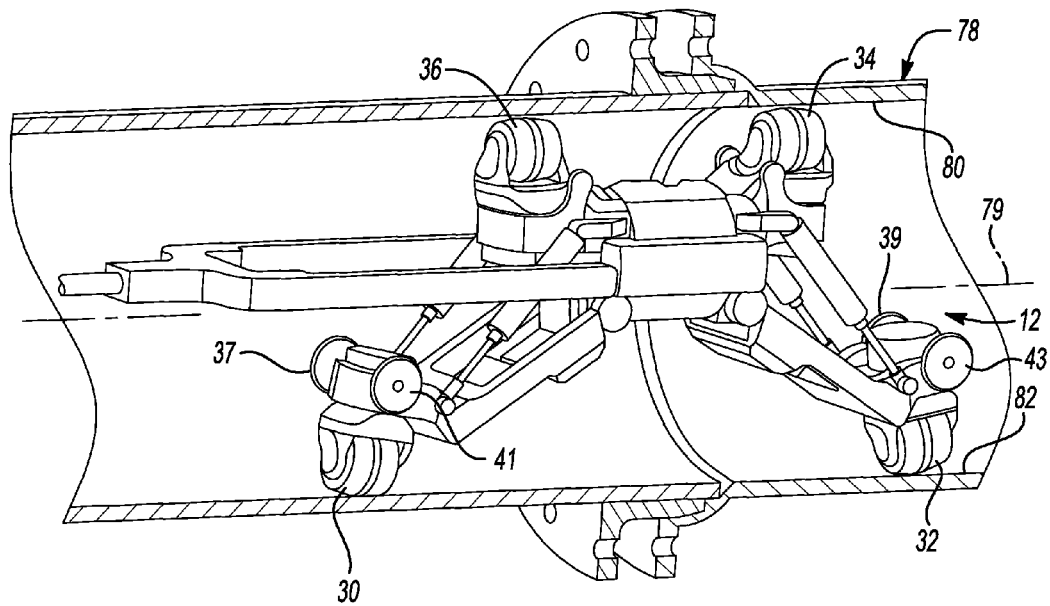
FIG. 3 shows the system from FIG. 1 having drive wheels rotated 90°.

As described above, the wheels 30, 32, 34, 36 are in a first orientation when they drive the transport module 12 longitudinally along the wall inside of a pipeline; FIGS. 1 and 2 show the drive wheels in this orientation. Each of the wheels 30, 32, 34, 36 has a respective first axis 62, 64, 66, 68 around which the drive wheels rotate when they are being operated to move the transport module 12. Each of the drive wheels 30, 32, 34, 36 is also rotatable around a respective second axis 70, 72, 74, 76, each of which is generally perpendicular to its respective wheel's first axis. As shown in FIG. 3, the transport module 12 is disposed inside a pipeline 78, which has a longitudinal axis 79. In FIG. 3, each of the wheels 30, 32, 34, 36 has been rotated around its respective second axis 70, 72, 74, 76 so that it is shown in the second orientation. In this orientation, the drive wheels 30, 32, 34, 36 are operable to drive the transport module 12 circumferentially around a wall 80 inside the pipeline 78, and more specifically around an interior surface 82 of the pipeline 78.

Figure 4:
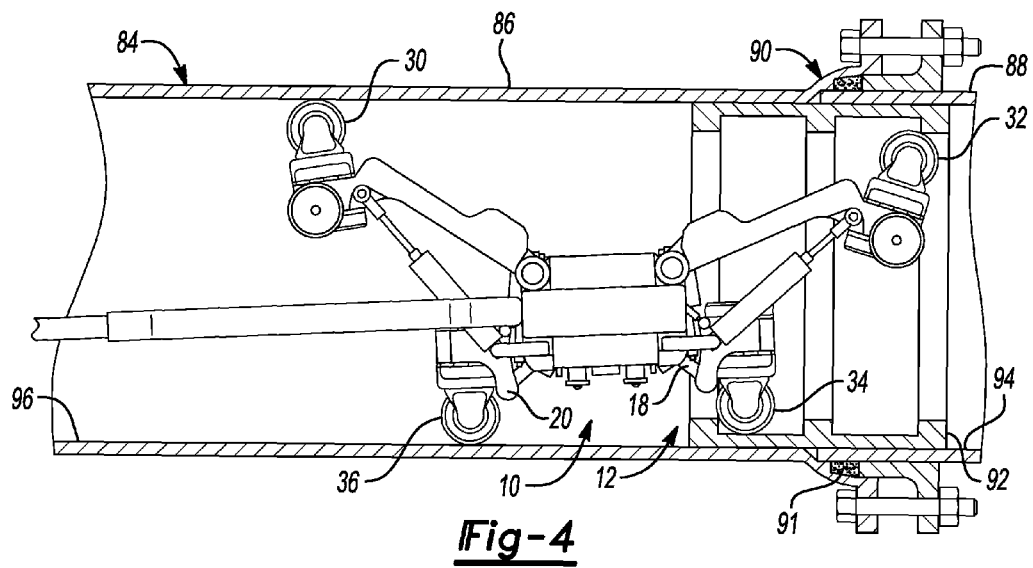
FIG. 4 shows the system from FIG. 1 traversing a joint in a pipeline having an internal seal.

Another advantage of a system, such as the system 10, is illustrated in FIG. 4, where the system 10 is shown inside a pipeline 84. Shown in FIG. 4, are two sections 86, 88 of the pipeline 84 having a joint 90, generally referred to as a "mechanical joint". A seal 91 is wedged into the "bell" of pipeline section 86, which compresses the "spigot" of pipeline section 88. Internal seals, such as internal seal 92, may be added to a pipeline joint after failure of the original seal. The internal seal may be, for example, a weko-seal, or some other type of lip seal or other internal seal. One potential problem of robotic devices used inside pipelines is that the device could disrupt a good seal as it moves past and over the seal inside the pipeline. Embodiments of the present invention, such as the system 10, account for this potential problem by allowing independent actuation of the arms 14, 16, 18, 20, such that they are independently movable toward and away from an interior surface 94 of the pipeline 84.

As shown in FIG. 4, the arms 14, 20 are extended securely along a wall 96 inside the pipeline 84, and more specifically, are each in contact with the interior surface 94. In contrast, the arms 16, 18 are disengaged from the wall 94 and interior surface 96—that is, they have little or no extension force applied to them. The arms 14, 16 are movable radially inward so they do not contact the interior surface 94 as they approach the seal 92. Thus, as they traverse the internal seal 92, the wheels 32, 34 do not contact the seal 92 with enough force to disrupt it. Once on the other side of the seal 92, the arms 16, 18 can be forcefully extended, while the arms 14, 20 can be disengaged from the wall 96 of the pipeline 84 so that they will not disrupt the seal 92 as they pass over it.

Figure 5:
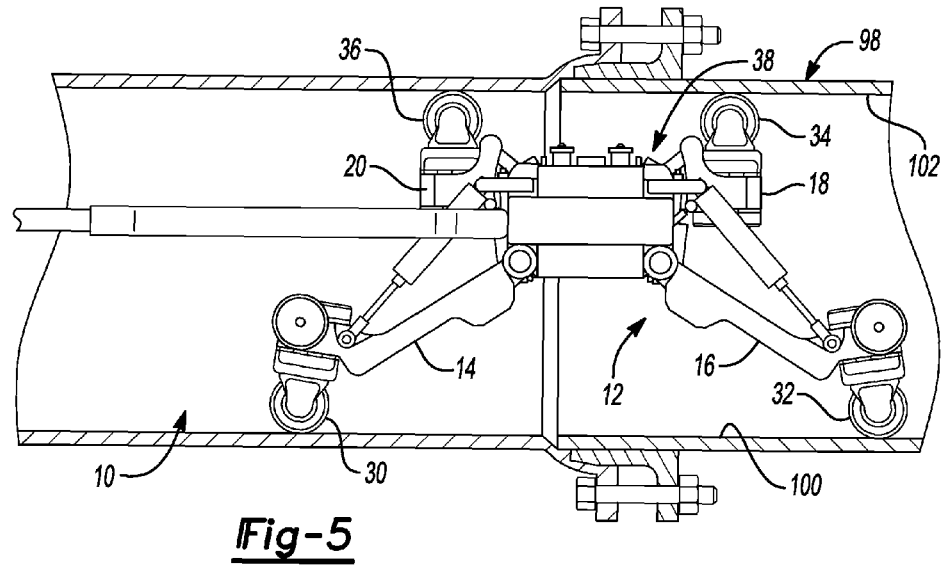
FIG. 5 shows the system from FIG. 1 having the payload disposed radially toward an interior surface of the pipeline.

FIG. 5 shows the system 10 inside a pipeline 98 with the payload 38 having been moved radially upward toward an inside wall 100 of the pipeline 98. The drive wheels 30, 32, 34, 36 are shown in their first orientation, which is convenient for moving the payload 38 toward and away from an interior surface 102 of the pipeline 98. Moving a payload, such as the payload 38, toward and away from the interior surface 102 of the pipeline 98 involves extending the arms 14, 16 and retracting the arms 18, 20. As described above, the arms 14, 16 pivot around a point on the transport module 12, and therefore move along an arc. It is therefore convenient to have the wheels 30, 32, 34, 36 in their first orientation so that they rotate along the inside surface 102 of the pipeline 98 as the arms 14, 16 are extended and the arms 18, 20 are retracted. At the same time the arms are extended and retracted, the wheels 30, 32, 34, 36 are driven in coordination with the arm movement to move the payload 38. Although conventional wheels 30, 32, 34, 36 are illustrated and described herein, it is understood that some or all of these wheels could be "universal wheels", which allow movement in perpendicular directions without reorienting the wheel.

Figure 6:
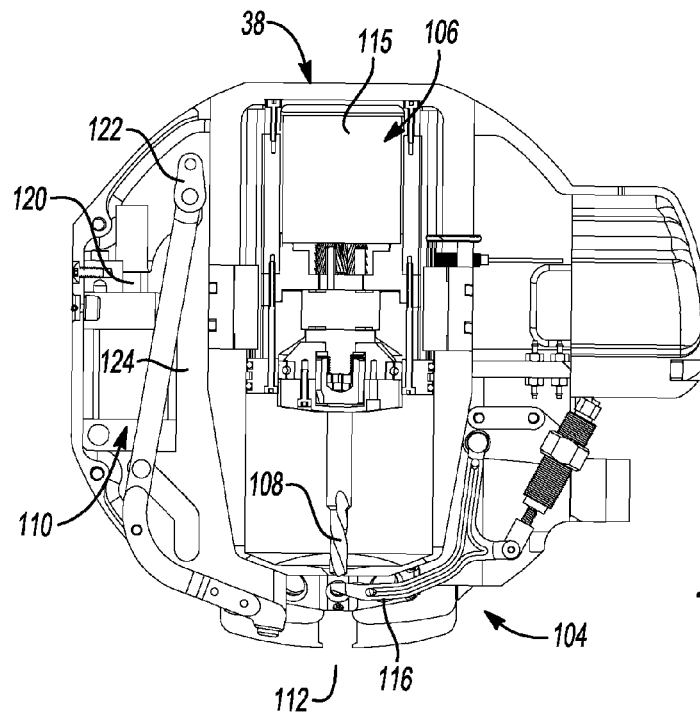
FIG. 6 shows a portion of the payload having a drill head and sealing nozzle in their respective retracted positions.

The payload 38 includes a tool arrangement 104, which is shown, for example, in FIG. 6. The tool arrangement 104 includes a drill system 106 having a drill bit 108, and a sealing system 110 having a sealing nozzle 112. The drill system 106 includes a drill actuator 114—see FIG. 7—which is operable to move the drill bit 108 linearly toward and away from the interior surface of a pipeline, such as the pipeline 98 shown in FIG. 5. Thus, the payload 38 may be brought into close proximity with an interior surface 102 of the pipeline 98 by movement of the arms 14, 16, 18, 20 in coordination with movement of the drive wheels 30, 32, 34, 36, while the drill actuator 114 allows further movement of the drill bit 108. Operation of the drill actuator 114 can bring the drill bit 108 into contact with a structure—for example, the wall 100, an internal seal such as illustrated in FIG. 4, or other structure inside a pipeline. A second drill actuator 115 rotates the drill bit 108 so that it can drill through the structure to provide access for a sealant material.

In the embodiment shown in FIG. 6, the drill actuator 114 operates by rotation of lead screws which move the drill bit 108 linearly toward and away from an inside wall of the pipeline. In other embodiments, different types of drill actuators could be used, such as a pneumatic or hydraulic actuator. A drill cover 116 is shown in a first position covering the drill bit 108 when it is in a retracted position. The sealing system 110 also includes a sealing system actuator 120, which is separately operable from the drill actuator 114 to move the sealing nozzle 112 in-line with the drill bit 108 and toward and away from an interior surface of a pipeline. In the embodiment shown in FIG. 6, the sealing system actuator 120 includes a pneumatic cylinder which moves a linkage 122 attached to the sealing nozzle 112. The linkage 122 moves through a guide track 124 such that the sealing nozzle 112 is moved simultaneously toward an inside wall of the pipeline and laterally such that it is disposed in-line with the drill bit 108.

Figure 7:
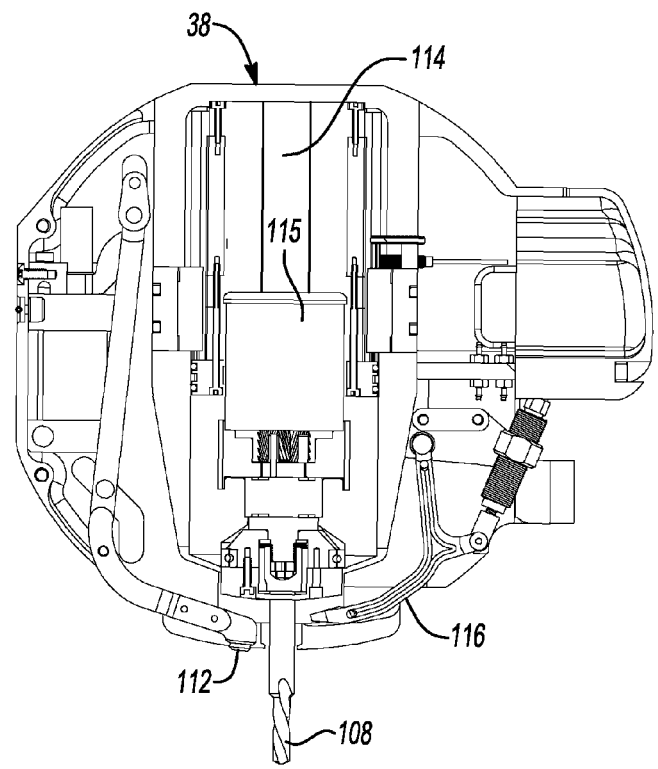
FIG. 7 shows the drill head and a drill bit in an extended position.
Figure 8:
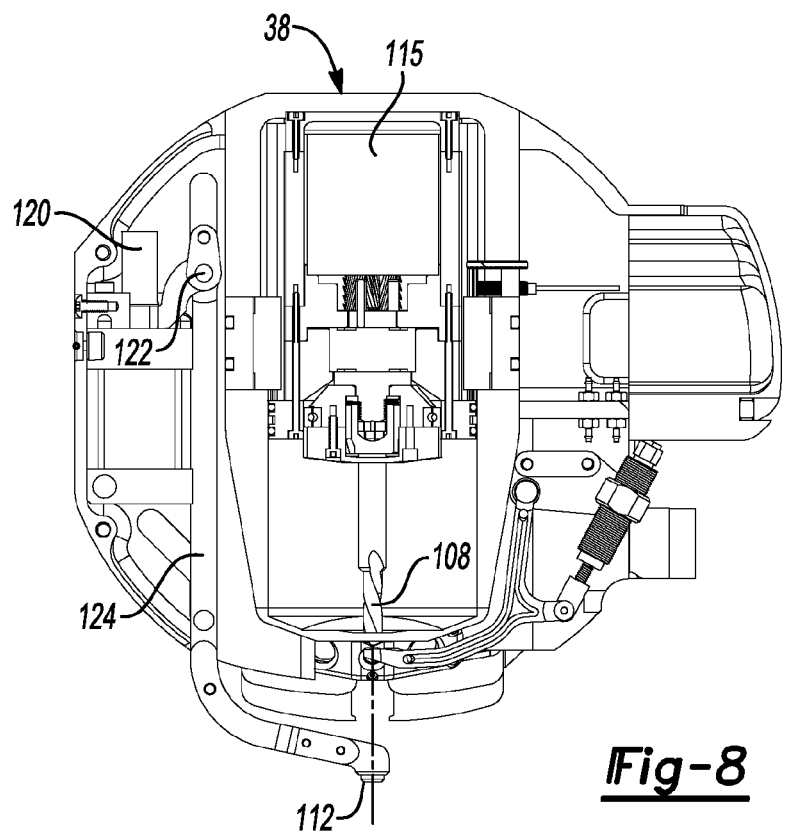
FIG. 8 shows the drill head in its retracted position and the sealant nozzle in an extended position.

FIG. 7 shows the payload 38 where the drill actuator 114 is in an extended position. The drill cover 116 is in a second position away from the drill bit 108, which allows the drill actuator 114 and the drill bit 108 to move toward a structure inside a pipeline. As shown in FIG. 7, the sealing nozzle 112 is in its retracted position just as it was in FIG. 6. FIG. 8 shows the payload 38 with the drill bit 108 retracted by the drill actuator 114. In this illustration, a sealing system actuator 120 has been actuated to move the linkage 122 down the guide track 124 such that the sealing nozzle 112 has not only been moved toward an interior surface of a pipeline—which is downward in the orientation of the drawing figure—but has also been moved laterally such that it is in-line with the drill bit 108. As further explained in conjunction with FIG. 10, the repair-module payload 38 is operable to drill a hole through a structure such as a wall or seal inside a pipeline, and then inject a sealing material, such as an anaerobic sealant, through the hole made by the drill bit.

Figure 9:
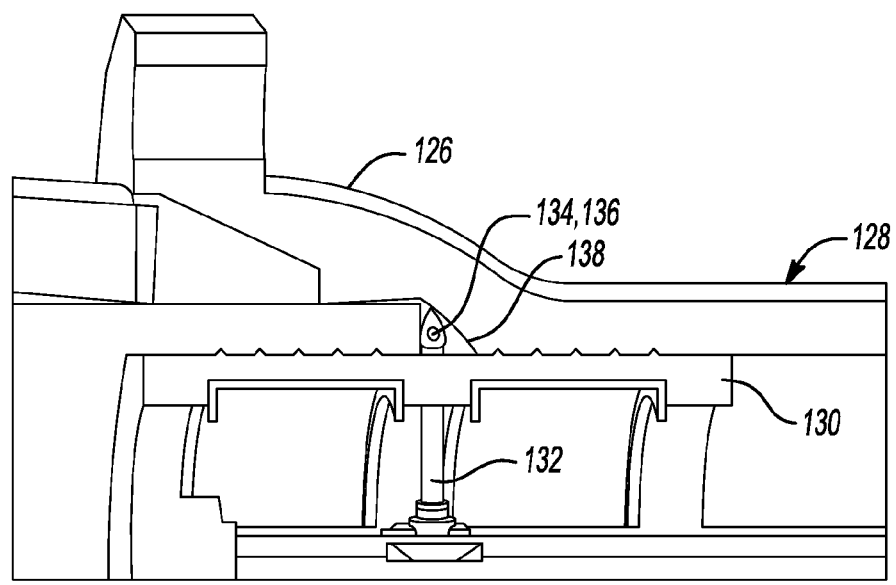
FIG. 9 shows an application of an embodiment of the present invention to a pipeline having an interior seal.

As described above, a structure inside a pipeline may be a wall of the pipeline, or it may be a seal, such as the seal 92 shown in FIG. 4. In the case where a seal is made from a relatively soft rubber material, it may not be necessary to drill through it, but rather, a sharpened tool may be used to pierce the seal and in some cases the same tool may be used to deliver the sealant material. Such a configuration is illustrated in FIG. 9, where an original mechanical joint 126 of a pipeline 128 has been repaired with a rubber seal 130. Although it is contemplated that payloads, such as the repair module 38, may contain any number of different types of repair tools, one tool that may be conveniently used with internal rubber seals is a hypodermic-type needle injector 132 as shown in FIG. 9. The injector 132 is configured as an elongate member having an open end 134 and a channel 136 disposed through it for delivering the sealant material through the open end 134 and through the puncture in the seal 130.

Using an embodiment of the present invention, the method of sealing includes puncturing the rubber seal 130 with the needle-like sealant nozzle 132 and injecting sealant directly into the annular space 138 between the seal 130 and the pipeline 128. In such a method, the proper sealant must be chosen to allow for expansion of the pipeline, which would otherwise have ample room to move in the annular space. Repairing the seal may also be accomplished by drilling a hole in the seal and injecting sealant into the drilled hole. This is similar to the process described above and illustrated in FIGS. 6-8, except that the drill will act on the rubber seal rather than a wall of the pipeline or some other internal structure. One or more locations around a circumference of the seal 130 may be drilled and injected, and weep holes may be included to allow gas to escape and to act as a visual indicator that sealant is adequately filling the space around the seal. A vacuum may be created on one of the holes to assist in the filling process. This vacuum may alleviate potential air bubbles or pockets forming during the filling operation.

Figure 10:
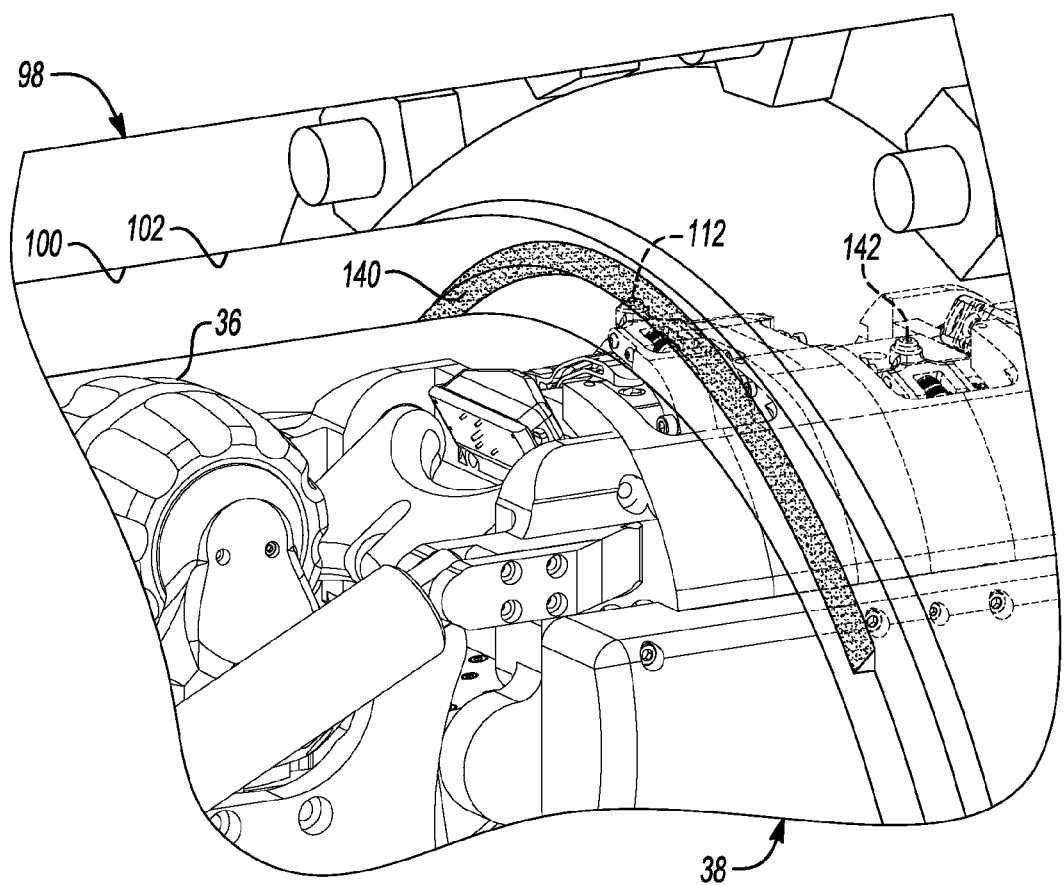
FIG. 10 shows a bead of sealant after it is injected into the pipeline joint by the sealing nozzle.

FIG. 10 shows a close-up view of the payload 38 as it is brought into close proximity with the interior surface 102 of the pipeline 98—see also FIG. 5. In this illustration, the drill bit 108 has already drilled through the inside wall 100 of the pipeline 98 and the sealing nozzle 112 has been extended and engaged with the hole made by the drill bit 108. The sealing nozzle 112 has injected a bead of sealant 140 into a joint space of the pipeline 98. As shown in FIG. 10, the bead of sealant 140 does not extend around the entire circumference of the pipeline 98. This may be the case when the pipeline being worked on has a relatively large diameter. In such a case, the transport module 12 can rotate the repair module 38 to another radial position within the pipeline 98—see description above in conjunction with FIG. 3. Once in the new position, the drill bit 108 can be extended to drill another hole into the wall 100 of the pipeline 98. Sealant can then be injected in the new hole to complete the circumferential sealing of the joint space. FIG. 10 also shows a second sealing nozzle 142 disposed adjacent to the sealing nozzle 112. Just as the drill system 106 is disposed proximate to and works in conjunction with the sealing nozzle 112, so too is there a second drill system—not visible in FIG. 10—that works in conjunction with the sealing nozzle 142. Duplicating these tools on the payload 38 provides for efficiencies not available for a drill and sealing system having only one set of tools.

Figure 11:
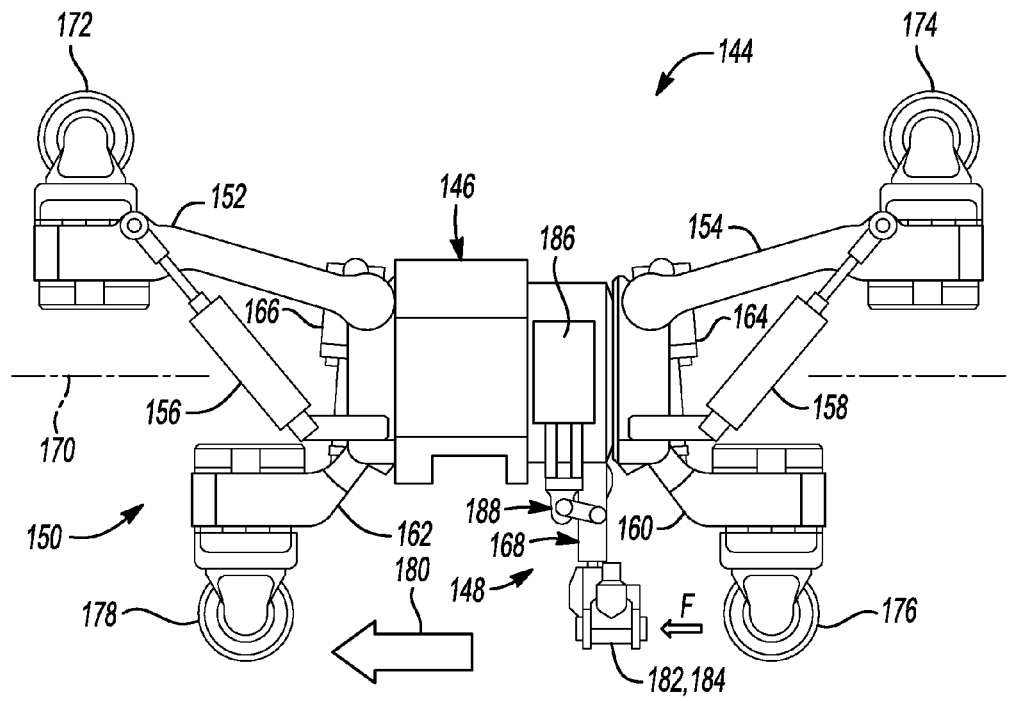
FIG. 11 shows a system in accordance with embodiments of the present invention having a payload that includes a sensor arrangement with a sensor arm extended.

As described above, a system, such as the system 10, may include a number of different types of payloads, such as the payload 38 consisting of a repair module having a tool arrangement for sealing a joint space inside a pipeline. Another type of payload has a sensor arrangement configured to aid in the inspection of a pipeline. As noted above, maintenance of the pipeline may include repair activities, inspection activities, or both. FIG. 11 shows a portion of a system 144 in accordance with another embodiment of the present invention. In this embodiment, a payload 146 includes a sensor arrangement 148 configured to carry one or more sensors for measuring at least one characteristic of a pipeline. Although the transport module 12 illustrated and described above could be used to carry a payload, such as the payload 146, the system 144 includes a transport module 150 configured slightly differently from the transport module 12 shown, for example, in FIG. 1.

The two upper arms 152, 154—"upper" meaning as shown in the drawing figure, it being understood that the system 144 may assume any of a number of different orientations inside a pipeline—are configured similarly to the arms 14, 16 shown in FIG. 1. Specifically, the arms 152, 154 are pivotably attached to respective portions of the transport module 150 and are extended and retracted by respective pneumatic cylinders, only two of which are visible in FIG. 11—i.e., cylinders 156, 158. The two lower arms 160, 162 are also actuated by pneumatic cylinders 164, 166, but they differ from the arms 18, 20 shown in FIG. 1 largely based on how they are attached to the transport module 150. Rather than using a linkage, such as a 4-bar linkage as illustrated in FIG. 1, the arms 160, 162 are pivotably attached to the transport module 150 in a similar fashion to the upper arms 152, 154. Thus, rather than extending and retracting in a generally straight line, they move in an arc like the upper arms 152, 154.

Figure 12:
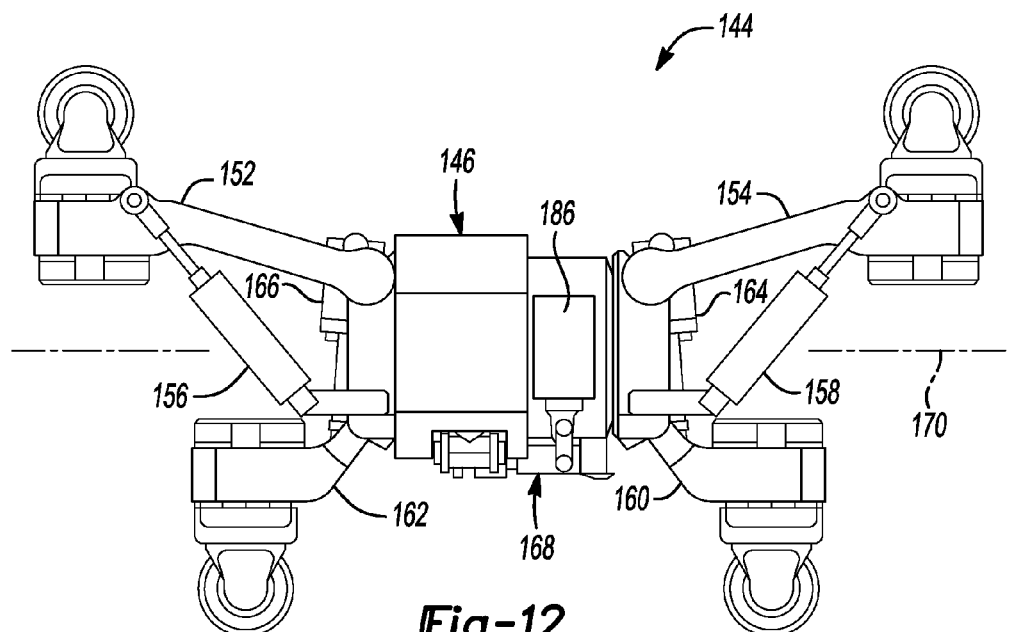
FIG. 12 shows the payload from FIG. 11 with the sensor arm retracted.

In the embodiment shown in FIG. 11, the sensor arrangement 148 includes a sensor arm 168 that is movable between an open position such as shown in FIG. 11 and a closed position such as shown in FIG. 12. In the closed position, the sensor arm 168 is generally parallel to a longitudinal axis 170 of the transport module 150. Conversely, when the sensor arm 168 is in the open position, it is generally perpendicular to the longitudinal axis 170 of the transport module 150. The system 144 includes drive wheels 172, 174, 176, 178 respectively attached to the arms 152, 154, 160, 162, which may also include idler wheels such as the idler wheels 37, 39, 41, 43 described and illustrated above in conjunction with the system 10.

During operation, the system 144 will often travel in the direction of arrow 180 with the sensor arm 168 extended as shown in FIG. 11. As it travels down the pipeline, sensor modules 182, 184—shown in more detail in FIG. 13—will measure parameters of the pipeline and detect certain conditions, such as wall thinning, corrosion, stress, strain, leakage, etc. Sensors, such as the sensor modules 182, 184, may be visual, auditory, eddy current, ultrasonic, magnetic, or any other of a number of desirable types of sensors or sensor arrangements useful for identifying and locating problem areas within a pipeline. The payload 146, or other portions of the system 144, may carry one or more video cameras, lights or other devices which may also be useful for identification and repair of a pipeline. The payload 38 illustrated and described above may also carry sensors, cameras, lights or other devices, and in some embodiments of the present invention, a single payload may include both tool arrangements and sensor arrangements, and may be used for both inspection maintenance and repair maintenance.

Figure 13:
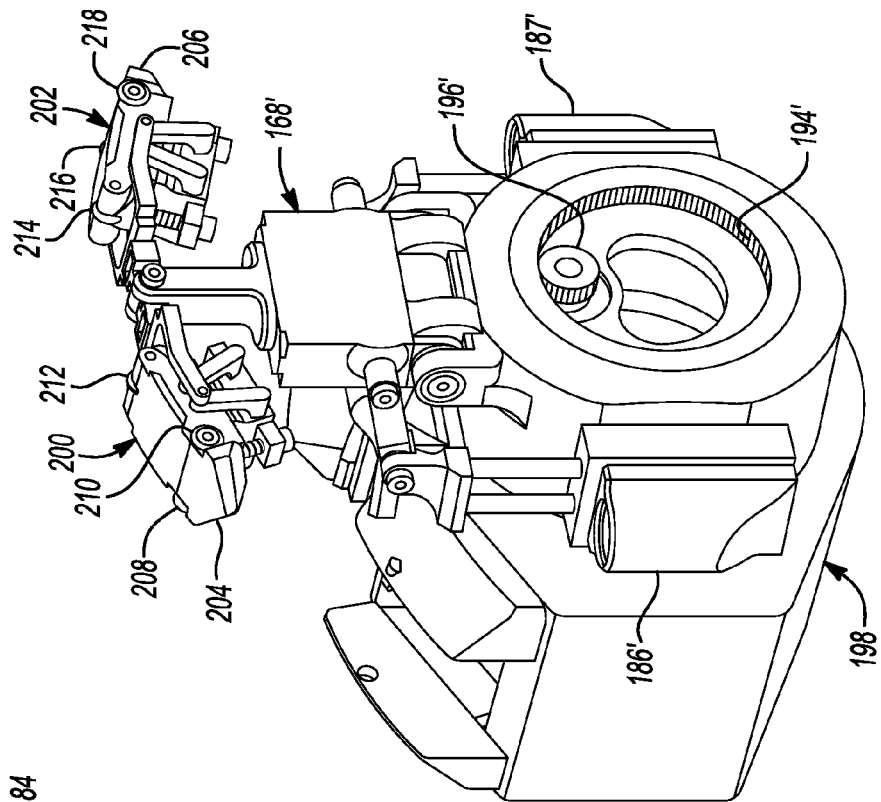
FIG. 13 shows the sensor arm and two sensors disposed on a rotatable portion of the payload.

The sensor arm 168 is moved between the extended position as shown in FIG. 11 and the retracted position as shown in FIG. 12, by two pneumatic cylinders 186, 187—see also FIG. 13. The payload 146 includes a linkage arrangement 188 for guiding movement of the sensor arm 168 between the open and closed—extended and retracted—positions. As explained below, the linkage arrangement 188 is configured to be flexible in one direction, but relatively rigid in the other.

Figure 17:
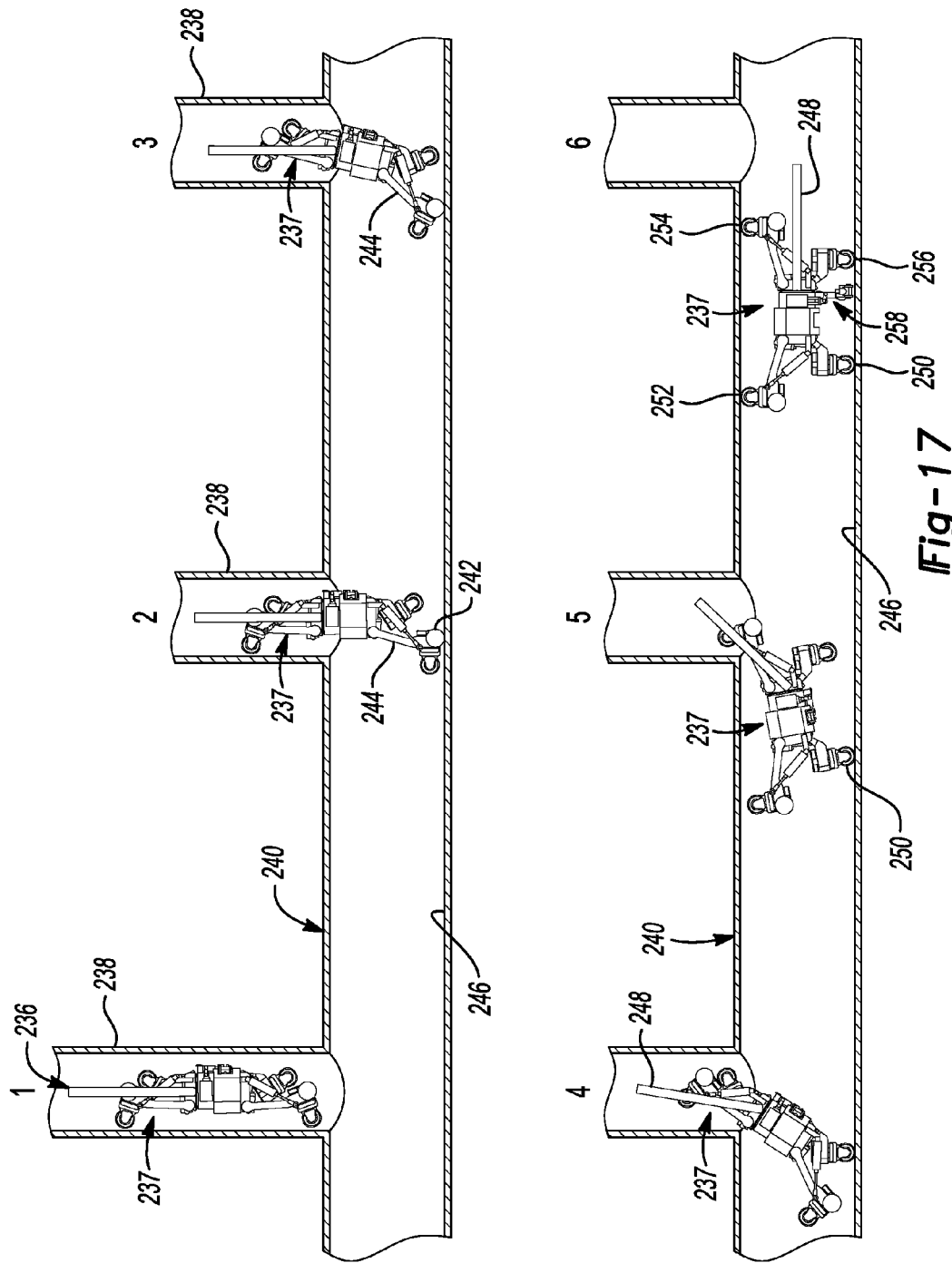
FIG. 17 shows the system from FIG. 11 being launched into a pipeline.

Although not shown in FIG. 11, it is likely that a cable guide, such as the cable guide 40 shown in FIG. 1, will be attached to the transport module 150 on its right side as it is oriented in FIGS. 11 and 12—see also FIG. 17. If the transport module 150 is unable to return itself and the payload 146 to the pipeline opening—for example, in the case of a power failure—it may be necessary to manually retrieve it by exerting a force on the cable attached to the cable guide. The transport module 150 will then be moving in a direction opposite the direction of arrow 180. It is possible that the same power or other failure will also keep the sensor arm 168 from being retracted to the closed position. In such a case, the sensor arm 168 could encounter an obstacle while it is in the extended position and the transport module is being manually retrieved. This may result in a force (F) acting on the sensor arm 168 as shown in FIG. 11. Therefore, the linkage arrangement 188 provides a flexible support in the presence of a force acting on the sensor arm 168 in a direction toward the closed or retracted position, such as shown in FIG. 11. This helps to ensure that the sensor arm 168 will not be damaged in the presence of such a force. Conversely, the linkage arrangement 188 provides a relatively rigid support in the presence of a force acting on the sensor arm 168 in a direction toward the open position, which would be in the direction opposite of the force (F) shown in FIG. 11.

FIG. 13 shows the payload 146, including the sensor arrangement 148 attached from the transport module 150. In this view, it is shown that a portion 190 of the payload 146 is rotatable around the axis 170 relative to the stationary portion 192 of the payload 146. As described above in conjunction with the repair module 38, the system 10 was operable to position the repair module 38 at any desired clock position around the circumference of the inside of the pipeline by rotating the drive wheels to their second orientation and rotating the entire transport module 12 to the desired position. For purposes of performing inspection maintenance with a sensor arrangement, it may be desirable to have the sensors independently rotatable around the circumference of the inside of a pipeline while the remainder of the transport module remains stationary. Therefore, embodiments of the present invention, such as in the case of the payload 146, are configured with this functionality.

In the embodiment shown in FIG. 13, the rotatable portion 190 of the payload 146 includes a ring gear 194, which is driven by a pinion 196 powered by a motor, which is not visible in FIG. 13. Rotation of the pinion 196 causes rotation of the rotatable portion 190, and therefore rotation of the sensor arm 168 and the sensor modules 182, 184. With this configuration, it may be possible to rotate the sensor arm 168 360° or more around the inside surface of a pipeline. Although not limited by the gearing, other factors such as the provision of power, communications and pneumatics to the sensor arrangement 148 may limit the angular rotation of the rotatable portion 190.

Figure 14:
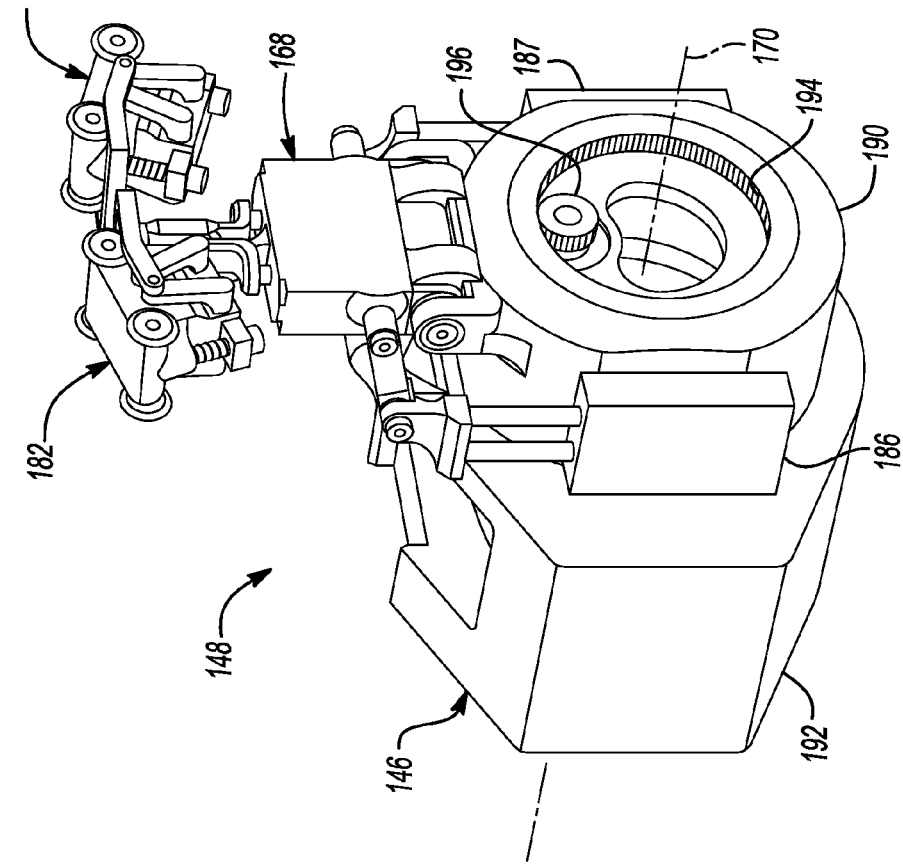
FIG. 14 shows a sensor arm and two sensors in accordance with another embodiment of the present invention.

FIG. 14 shows a payload 198 in accordance with another embodiment of the present invention. Although it includes many similar features to those shown in conjunction with the payload 146—features which are labeled with similar numbers using the prime (') symbol—the sensors 200, 202 are configured differently from the sensor modules 182, 184. Specifically, the sensors 200, 202 include a cleaning arrangement, which in the embodiment shown in FIG. 14, includes blocking members 204, 206. During use, wheels 208, 210, 212 on the sensor 200 and wheels 214, 216, 218 on the sensor 202 may contact the interior surface of the pipeline as the transport module is moving; therefore, the sensors 200, 202 may be very close to an inside surface of the pipeline, and may encounter various kinds of debris.

To help keep the debris away from the sensors 200, 202, the blocking members 204, 206 are configured with a wedge shape to move the debris to the side of the sensors 200, 202 as the transport module moves through the pipeline. The blocking members 204, 206 are disposed on opposite ends of the sensors 200, 202 to perform the cleaning function regardless of the direction of travel of the transport module. Although the embodiment shown in FIG. 14 includes blocking members forming at least a part of the cleaning arrangement, other embodiments may include other types of cleaning arrangements to be used in conjunction with, or instead of, blocking members—e.g., a jet of gas, such as air or nitrogen, could be diverted from the pneumatic lines supplying the various pneumatic cylinders already in use with the system.

Figure 15:
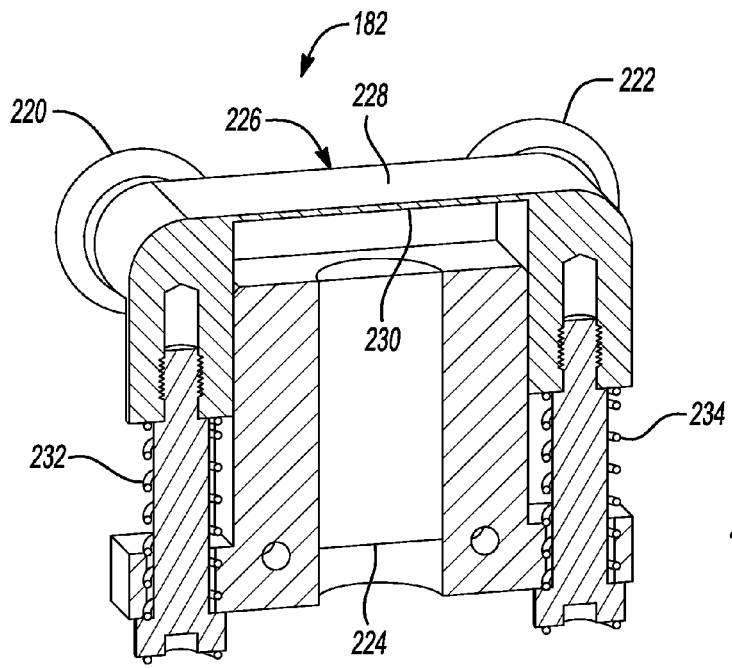
FIG. 15 shows one of the sensors from FIG. 13 biased away from a sensor cover.

FIG. 15 shows a cutaway view of the sensor module 182 shown in FIG. 13. Wheels 220, 222 are configured to contact the inside surface of the pipeline when the sensor arm 168 is in the extended position. In the embodiment shown in FIG. 15, the sensor module 182 includes a number of elements in addition to an actual sensor device 224. One of these is a sensor cover 226, which is disposed over the sensor 224 for isolating the sensor 224 from contact with the interior surface of the pipeline, or debris within the pipeline. The sensor cover 226 includes an exterior surface 228 disposed away from the sensor 224 and an interior surface 230 disposed toward the sensor 224. The sensor cover 226 is biased away from the sensor 224 by springs 232, 234, and the sensor module 182 remains in this position until it is urged against the interior surface of the pipeline.

Figure 16:
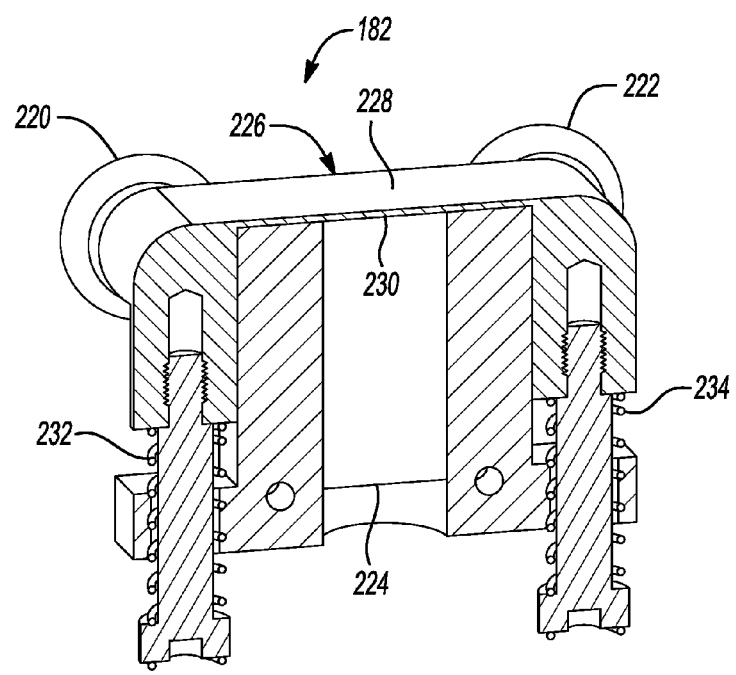
FIG. 16 shows the sensor contacting the sensor cover.

Once the sensor module 182 is urged against an inside wall of a pipeline, and more particularly, once the wheels 220, 222 are brought into contact with the pipeline and a force exerted toward the pipeline wall, a distance between the sensor 224 and the sensor cover 226 is reduced. As shown in FIG. 16, the sensor 224 may even be brought into contact with the inside surface 230 of the sensor cover 226. This kind of arrangement may be particularly beneficial when the sensor 224 is magnetic because metal debris may collect on the exterior surface 228 of the sensor cover 226 as measurements are being taken; however, when the force is no longer exerted on the sensor module 182 and the sensor 224 is again biased away from the sensor cover 226 is shown at FIG. 15, the magnetic pull of the sensor 224 may be diminished enough such that the metallic debris no longer adheres to the exterior surface 228.

FIG. 17 shows six stages of a launch of a system 236, having a transport module 237 in accordance with an embodiment of the present invention. Although the payload includes an inspection module in FIG. 17, a similar launch sequence may be applicable to a repair-module payload. In Stage 1, the arms of the transport module 237 are fully retracted so that the transport module can fit through a relatively small diameter—as compared to a pipeline—launch tube 238. It is understood that the system 236 is configured similarly to the systems 10 and 144 illustrated and described above, and therefore, many of the features are not labeled so as to increase clarity in the drawing figure. As it exits the launch tube 238, the transport module 237 enters a pipeline 240. As shown in Stage 2, the transport module 237 includes an idler wheel 242—and another idler wheel on an opposite side of the arm 244 which is not visible in this view—which contacts the interior surface 246 of the pipeline 240.

At Stage 3, the transport module 237 further enters the pipeline 240 while the arm 244 is extended outward to help facilitate the turn from the launch tube 238 to the pipeline 240. At Stage 4, a cable guide 248 pivots relative to the transport module 237, again to help facilitate the 90° turn as the system 236 enters the pipeline 240. As Stage 5, one of the drive wheels 250 contacts the interior surface 246 of the pipeline 240. At Stage 6, the entire transport module 237 and the cable guide 248 are fully within the pipeline 240. All four drive wheels 250, 252, 254, 256 are in contact with the interior surface 246 of the pipeline 240. In addition, a sensor arm 258 has been extended and the transport module 237 is now ready to move down the pipeline 240 toward the left as shown in the drawing figure.

Figure 18:
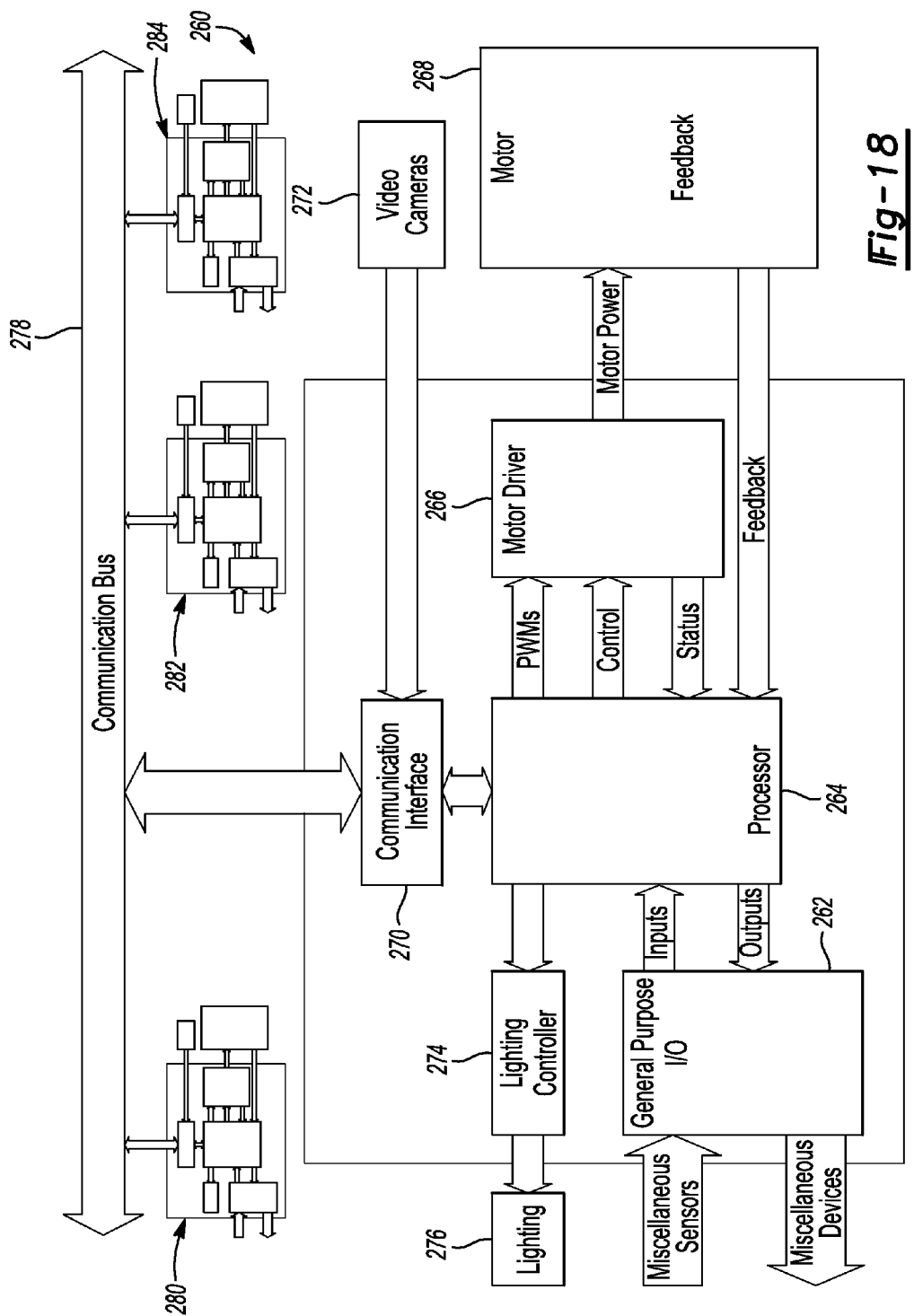
FIG. 18 shows a schematic representation of a control module in accordance with embodiments of the present invention.

In order to effect control of the various components of a system, such as the systems 10, 144, 236, embodiments of the present invention may employ a control module, such as the control module 260 illustrated in FIG. 18. The control module 260 has general-purpose inputs and outputs 262 which communicate with a main processor 264. The processor 264 provides pulse-width-modulation control and other types of control to a motor driver 266, which controls a motor 268, which may be a motor used to operate drive wheels or drill system actuators as described above. A communication interface 270 also communicates with the processor 264 and further communicates with, for example, video cameras 272. The processor 264 may also provide outputs to a lighting controller 274, which may control lights 276, such as described above. The entire control module 260 may communicate with a communication bus 278, which itself communicates with other control modules 280, 282, 284, each of which may control a different portion of a system, such as the system 10. This control system can also be used to control other aspects of a system in accordance with embodiments of the present invention—for example, control of solenoid actuated pneumatic valves that control the flow of gas to pneumatic cylinders, such as those described above used with the arms of the transport module. It is understood that the control module 260 is just one kind of configuration that can be used with embodiments of the present invention.

A method in accordance with embodiments of the present invention is now described in more detail, with reference to various elements shown in the drawing figures and described above. A method for pipeline maintenance may include launching a transport module, such as the transport module 237, into a pipeline, such as the pipeline 240. The transport module may carry a payload, such as the payload 38 described in conjunction with the system 10, or a payload such as the payload 146 described in conjunction with the system 144. A plurality of arms may be extended from the transport module toward an interior surface of the pipeline, such that drive wheels, each of which is attached to a respective one of the arms, contact the interior surface of the pipeline—see, e.g., Stage 6 in FIG. 17. The drive wheels may be operated while in a first orientation—see FIG. 2—to move the transport module linearly along a length of the pipeline.

Operation of the drive wheels may be stopped, and then the drive wheels may be rotated from their first orientation to a second orientation where a respective first axis of each rotated wheel is generally parallel to a longitudinal axis of the pipeline—see, e.g., FIGS. 2 and 3. Then the drive wheels may be rotated to rotate the transport module from a first radial position to a second radial position around the inside of a pipeline—see FIGS. 3 and 5. The arms may then be pivoted to move the payload toward the interior surface of the pipeline, such as illustrated in FIG. 5. Prior to pivoting the arms to move the payload toward the interior surface of the pipeline, the drive wheels may be rotated from the second orientation back to the first orientation, which is how they are shown in FIG. 5.

As shown in FIG. 9, the payload may include an elongate member which may be moved through a seal disposed inside the pipeline, and then a sealant material may be delivered through the elongate member and through the seal, for example into the annular space 138 as shown in FIG. 9. In other embodiments, a drill actuator, such as the drill actuator 114 shown in FIGS. 6-8 is operated to move a drill bit linearly toward the interior surface of a pipeline. The hole is drilled through an interior structure of the pipeline, which as noted above, may be a wall of the pipeline itself, a seal, or some other structure inside the pipeline. The drill actuator is then operated to move the drill bit linearly away from the interior surface of the pipeline, and a sealing system actuator is operated to move the sealing nozzle to cover the hole created by the drill bit, and sealant is then injected through the sealing nozzle and into the hole, for example, as shown in FIG. 10.

As described in detail above, embodiments of the present invention may include a payload having a sensor arrangement configured for sensing one or more parameters related to the pipeline—see, e.g., the sensor arrangement 148 illustrated and described in conjunction with FIG. 11. A sensor arm, such as the sensor arm 168 is moved from a closed position as shown in FIG. 12 to an open position as shown in FIG. 11, and the sensor arm may be rotated circumferentially around the interior of a pipeline, for example by the pinion and ring gear system illustrated in FIG. 13. A sensor module, such as the sensor module 182, may then be operated to measure at least one parameter of the pipeline. In embodiments where a sensor, such as the sensor 224 shown in FIG. 15, is biased away from the interior surface of a pipeline, the arms of the transport module may be articulated so that the sensor module is brought into contact with the interior surface of the pipeline, and the sensor is urged toward the sensor cover such as illustrated in FIG. 16.

In situations where an intact rubber seal or other structure is encountered inside a pipeline, at least one of the arms of a transport module, such as the transport module 12 shown in FIG. 4, may be retracted so that a drive wheel of at least one of the arms does not contact the interior surface of the pipeline. Contact between at least two of the other drive wheels is maintained with the interior surface of the pipeline, which provide stability for the transport module. Once the transport module has moved far enough down the pipeline so that the retracted drive wheels—for example, drive wheels 32, 34 shown in FIG. 4—have moved beyond the seal, then their respective arms 16, 18 are again extended while the other two arms 14, 20 are retracted so that their respective drive wheels 30, 36 can traverse the seal 92 without damaging it. After the drive wheels 30, 36 are beyond the seal 92, the arms 14, 20 may again be extended so that all four drive wheels 30, 32, 34, 36 are in contact with the interior surface 96 of the pipeline 84.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for pipeline maintenance, comprising:
a payload including at least one of a sensor arrangement or a tool arrangement;
a transport module connected to the payload and including a plurality of movable arms, at least some of which are pivotable with respect to the payload in a plane containing a longitudinal axis of the payload, and a plurality of drive wheels, each of which is attached to a respective end of one of the movable arms, and
wherein a first pair of the arms is positioned on a side of the payload perpendicular to the longitudinal axis of the transport module and a second pair of the arms is positioned on a second side of the payload opposite the first side of the payload, at least a portion of the payload being longitudinally disposed between one arm of the first pair of the arms and between one arm of the second pair of the arms, at least one of the pairs of arms being pivotable relative to the payload such that the at least a portion of the payload is movable transversely to the longitudinal axis of the transport module to a position longitudinally aligned with the wheels attached to the other pair of the arms.

2. The system of claim 1, wherein each of the arms is independently movable such that at least one of the arms is movable to disengage its respective drive wheel from a wall inside the pipeline while at least two other of the drive wheels engage the wall inside the pipeline.

3. The system of claim 1, further comprising a conduit arrangement extending outward from the transport module and configured to carry a cable connectable to the payload, the conduit arrangement being pivotably attached to the transport module to facilitate entry into the inside of the pipeline.

4. The system of claim 1, wherein the drive wheels are disposed in a first orientation when operated to drive the transport module longitudinally along the wall inside the pipeline, and a second orientation generally perpendicular to the first orientation when operated to drive the transport module circumferentially around the wall inside the pipeline.

5. The system of claim 1, wherein the payload includes the sensor arrangement, the sensor arrangement including a sensor for measuring at least one characteristic of the pipeline, a portion of the sensor arrangement being rotatable around a longitudinal axis of the transport module to orient the sensor at a desired angular position inside the pipeline.

6. The system of claim 5, wherein the sensor arrangement further includes a sensor cover disposed over the sensor for isolating the sensor from contact with the wall inside the pipeline, the sensor cover including an exterior surface disposed away from the sensor, and an interior surface disposed toward the sensor, the sensor cover being biased away from the sensor such that when a portion of the sensor arrangement is urged against the wall inside the pipeline, a distance between the sensor and the sensor cover is reduced.

7. The system of claim 6, wherein the sensor arrangement further includes a cleaning arrangement disposed proximate the sensor for reducing debris at the sensor cover.

8. The system of claim 7, wherein the cleaning arrangement includes a blocking member disposed in front of the sensor cover and configured to move debris away from the sensor cover as the sensor arrangement moves inside the pipeline.

9. The system of claim 5, wherein the sensor arrangement further includes a sensor arm configured to carry at least one of the sensors, the sensor arm being movable between a closed position generally parallel to a longitudinal axis of the transport module and an open position generally perpendicular to the longitudinal axis of the transport module.

10. A method for pipeline maintenance, comprising:
launching a transport module carrying a payload into a pipeline;
extending a plurality of arms from the transport module toward an interior surface of the pipeline such that drive wheels, each of which is attached to a respective one of the arms, contact the interior surface of the pipeline; and
pivoting the arms in a plane containing a longitudinal axis of the transport module to move the payload toward the interior surface of the pipeline such that at least a portion of the payload positioned longitudinally between the arms is moved to a position longitudinally aligned with the wheels on at least two of the arms.

11. The method of claim 10, further comprising:
operating the drive wheels with the drive wheels in a first orientation to move the transport module linearly along a length of a pipeline;
stopping operation of the drive wheels and rotating at least some of the drive wheels from the first orientation to a second orientation wherein a respective first axis of each rotated wheel is generally parallel to a longitudinal axis of the pipeline;
driving the drive wheels to rotate the transport module from a first radial position to a second radial position; and
rotating the at least some of the drive wheels from the second orientation to the first orientation prior to pivoting the arms to move the payload toward the interior surface of the pipeline.

12. The method of claim 10, wherein the payload includes an elongate member extendable therefrom, and the step of pivoting the arms to move the payload toward the interior surface of the pipeline includes moving the elongate member through a seal disposed inside the pipeline, the method further comprising delivering a sealant through the elongate member and through the seal.

13. The method of claim 10, further comprising:
operating a drill actuator on the payload to move a drill bit linearly toward the interior surface of the pipeline;
drilling a hole through an interior structure of the pipeline;
operating the drill actuator to move the drill bit linearly away from the interior surface of the pipeline;
operating a sealing system actuator on the payload which is separate from the drill actuator to move a sealing nozzle to cover the hole; and
injecting sealant through the sealing nozzle and into the hole.

14. The method of claim 10, further comprising:
moving a sensor arm on the payload from a closed position generally parallel to a longitudinal axis of the transport module to an open position generally perpendicular to the longitudinal axis of the transport module;
rotating the sensor arm circumferentially around an interior of the pipeline; and
operating a sensor module on the sensor arm to measure at least one parameter of the pipeline.

15. The method of claim 14, further comprising moving the sensor arm toward the interior surface of the pipeline such that a portion of the sensor module contacts the interior surface of the pipeline and a sensor is urged toward a sensor cover disposed between the interior surface of the pipeline and the sensor.

16. The method of claim 10, further comprising:
retracting at least one of the arms such that a respective drive wheel of each of the at least one arm does not contact the interior surface of the pipeline;
maintaining contact between at least two other of the drive wheels and the interior surface of the pipeline; and
moving the transport module along the length of the pipeline until the respective drive wheel of each of the at least one arm has moved beyond a structure in the pipeline.

17. The method of claim 16, wherein two of the arms are retracted and the respective drive wheels of the two arms are moved beyond the structure in the pipeline, the method further comprising:
extending the two arms such that their respective drive wheels contact the interior surface of the pipeline;
retracting the at least two other arms such that their respective drive wheels do not contact the interior surface of the pipeline; and
moving the transport module along the length of the pipeline until the respective drive wheels of the at least two other arms have moved beyond the structure in the pipeline.

* * * * *